(12) United States Patent
Duerre et al.

(10) Patent No.: US 9,909,642 B2
(45) Date of Patent: Mar. 6, 2018

(54) DAMPER FOR A DRIVE TRAIN

(71) Applicant: Trelleborg Vibracoustic Gmbh, Darmstadt (DE)

(72) Inventors: Markus Duerre, Ann Arbor, MI (US); Wade Singler, St. Joseph, MI (US)

(73) Assignee: VIBRACOUSTIC GMBH, Darmstadt (DE)

( * ) Notice: Subject to any disclaimer, the term of this patent is extended or adjusted under 35 U.S.C. 154(b) by 35 days.

(21) Appl. No.: 14/681,583

(22) Filed: Apr. 8, 2015

(65) Prior Publication Data

US 2016/0298720 A1 Oct. 13, 2016

(51) Int. Cl.
| | |
|---|---|
| *F16F 15/12* | (2006.01) |
| *F16D 3/76* | (2006.01) |
| *F16F 15/126* | (2006.01) |
| *F16F 15/136* | (2006.01) |
| *F16F 15/14* | (2006.01) |
| *F16F 15/31* | (2006.01) |

(52) U.S. Cl.
CPC ............... *F16F 15/12* (2013.01); *F16D 3/76* (2013.01); *F16F 15/126* (2013.01); *F16F 15/136* (2013.01); *F16F 15/1442* (2013.01); *F16F 15/31* (2013.01)

(58) Field of Classification Search
CPC .. F16F 1/38; F16F 1/387; F16F 1/3821; F16F 15/10; F16F 15/12; F16F 15/31; F16F 15/3153; F16F 15/315; F16F 15/124; F16F 15/126; Y10T 74/2131
See application file for complete search history.

(56) References Cited

U.S. PATENT DOCUMENTS

| | | | | |
|---|---|---|---|---|
| 1,962,746 | A * | 6/1934 | Lee ........................ | F16F 15/126 74/574.4 |
| 2,795,036 | A * | 6/1957 | Haushalter .......... | F16F 15/1442 29/235 |
| 4,674,351 | A * | 6/1987 | Byrd ........................ | F16D 3/76 464/90 |
| 7,802,491 | B2 * | 9/2010 | Buck ...................... | F16F 15/126 74/574.4 |
| 7,802,492 | B2 * | 9/2010 | Christenson ........ | F16F 15/1442 74/574.4 |

FOREIGN PATENT DOCUMENTS

FR 2909428 A1 * 6/2008 ............ F16F 1/3821

* cited by examiner

*Primary Examiner* — Thomas C Diaz
(74) *Attorney, Agent, or Firm* — Dinsmore & Shohl LLP

(57) ABSTRACT

The invention relates to a torsional vibration absorber for a drive train, the vibration absorber having a hub and an inertia mass, and the vibration absorber having a connecting device with at least one elastomer body that elastically connects the hub and the inertia mass with one another, wherein the connecting device comprises at least one reinforcing member which is at least partially embedded in the elastomer body.

9 Claims, 18 Drawing Sheets

DAMPER FOR A DRIVE TRAIN

FIELD OF THE INVENTION

The invention relates to a torsional vibration absorber for a drive train, the vibration absorber having a hub and an inertia mass. In addition, the vibration absorber has a connecting device with at least one elastomer body that elastically connects the hub and the inertia mass with one another.

BACKGROUND OF THE INVENTION

Such vibration absorbers can be used, for instance, at a connecting point of two shafts, for example of a drive shaft and a cardan shaft, of a motor vehicle. Shaft ends can be connected by means of connecting devices which are capable of compensating a slight angular misalignment, for example. Such connecting devices may also have vibration dampers or absorbers in order to avoid irregularities of the rotary movement, for example torsional vibrations, which are caused by a drive means, for example an internal combustion engine, being propagated over the entire drive train.

Legal requirements regarding fuel economy can be met by a plurality of measures. Inter alia, it is possible to economize on fuel by engine cascade charging, turning off cylinders (AFM), a reduced number of cylinders (downsizing) or a motor operation at very low rotational speeds (down speeding). These measures frequently cause an increase of the torsional vibrations generated by the drive means, particularly in the low-frequency range.

Torsional joint shaft absorbers, which have, for example, a vibration absorber of the type mentioned in the introduction, can effectively reduce torsional vibrations in the drive train. Vibration absorbers, in particular rotary or torsional vibration absorbers, usually co-rotate with the shaft whose vibrations they are supposed to absorb. Consequently, when designing such components co-rotating with the drive train, care must be taken that the unbalance, for example of the joint shaft, does not increase excessively due to the joint shaft absorber attached, thereby inadvertently generating additional radial vibrations.

SUMMARY OF THE INVENTION

The invention is based on the object of further developing a vibration absorber of the type mentioned in the introduction such that the vibrations caused by the vibration absorber are reduced and the reliability of the vibration absorber is increased.

In order to achieve the object, it is proposed that a vibration absorber for a drive train having a hub and an inertia mass, the vibration absorber having a connecting device with at least one elastomer body that elastically connects the hub and the inertia mass with one another, is developed in such a way that the connecting device comprises at least one reinforcing member which is at least partially embedded in the elastomer body.

This solution is advantageous in that a radial rigidity of the connecting device is increased without substantially affecting an axial rigidity or a torsional rigidity. In particular, due to the increased radial rigidity, the deformation of the connecting device in the radial direction under stress is reduced. If the connecting device is deformed less in the radial direction, the result is a smaller displacement of the inertia mass relative to the hub. The eccentricity of the rotation of the inertia mass is thus reduced, which results in a reduced unbalance.

An elastomer layer under stress, such as it is disposed, for example, as an elastomer body between a hub and an inertia mass of a vibration absorber, bulges at its axial end faces under stress. Elastomers are substantially incompressible, so that the material of the elastomer layer compressed in the radial direction yields in the axial direction. Conversely, such an elastomer layer bulges inward at its axial end faces when pulled apart in the radial direction.

This deformation of the axial end faces is the greater the larger the surface area of the axial free end faces is relative to the bound, e.g. connected by vulcanization, surface area of the elastomer layer. The reinforcing member divides the elastomer body into several partial bodies, whose ratio of free to bound surface area is smaller than that of the original individual elastomer body. In the radial direction, the vibration absorber according to the invention is thus considerably more rigid, because the elastomer is able to yield only to a small extent, therefore requiring greater forces to compress the elastomer.

The properties in the axial direction and in the torsional direction are not affected, or only to a slight extent, by the reinforcing member.

The life and thus the reliability of the vibration absorber increases due to the smaller deformation of the surface of the elastomer body.

Furthermore, the solution according to the invention is dirt-resistant and not subject to any mechanical wear.

Advantageous embodiments are the subject matter of the dependent claims.

The reinforcing member may have a cylindrical spacer sleeve. Such a spacer sleeve can be particularly easily configured in such a way that it introduces no unbalance of its own into the vibration absorber.

The reinforcing member may have a plurality of cut-outs for accommodating elastomer. The elastomer body can thus be positively connected with the reinforcing member, which increases the reliability and the life of the vibration absorber. Furthermore, the positive connection can replace a substance-to-substance connection (connection by vulcanization), whereby cost-intensive working steps, such as the application of a binding agent, can be omitted. In addition to the costs, the stress on the environment is reduced at the same time.

The reinforcing member may have recesses disposed one behind the other in a circumferential direction and spaced apart. If the reinforcing member is vulcanized into the elastomer body, it is thus more easily possible to configure the vulcanization tool to be robust. In particular, more space is available for the vulcanization tool due to the recesses.

The connecting device may be configured such that it can be pressed into the inertia mass. This enables a modular configuration of the vibration absorber. By such a modular configuration, one and the same inertia mass can be combined with different connecting devices, resulting in vibration absorbers with different properties. Individual requirements can thus be addressed more flexibly during the production of the vibration absorber.

In the circumferential direction, the connecting device in an advantageous embodiment has at least one cut-out that can be closed when it is pressed into the inertia mass. This cut-out has the effect that no plastic deformation of metal parts is required for biasing or calibrating the elastomer body. When it is pressed in, the connecting device is compressed in the circumferential direction until the cut-out or gap is closed. This deformation of the connecting device is elastic. Because the diameter of the connecting device is thus reduced, the elastomer layers contained therein are compressed and thus calibrated. Compared with a calibration by deformation, a considerably higher bias or calibration can be achieved. Furthermore, the flexibility in the manufacture of the vibration absorber is increased, in particularly due to the fact that additional materials can be used.

The connecting device may have a main portion, which substantially extends in the axial direction, and a collar portion, which protrudes in the radial direction from the main portion, wherein the hub has a collar portion extending in the radial direction and resting against the collar portion of the connecting device. This substantially L-shaped cross section of the connecting device and the hub results in contact surfaces in the axial direction that counteract a tendency of the inertia mass to wobble. An increased cardanic rigidity is thus achieved. Therefore, if the inertia mass is cardanically deflected, it is straightened up again due to forces acting in the axial direction by means of the collar portions.

In order to improve its applicability on a joint shaft absorber, the inertia mass may have a disc-shaped connecting portion in which an opening for accommodating a deflection damping device is disposed.

The deflection damping device may have an annular body, from which projections for snap-in attachment in the openings project radially outwards, in each case axially at the end faces, in such a way that the projections, axially at the end faces, radially reach over edges of the openings in the snapped-in state. Such a deflection damping device can be easily mounted in the opening. The deflection damping device is pressed into the opening and compressed radially in the process. If the deflection damping device has reached its mounting position, the projections click into place at the axial ends of the opening and fix the deflection damping device. An additional working step for fixing the deflection damping device in the opening is not necessary.

In order to be able to also use materials that are not suitable for snap-in connections, the deflection damping device may have an annular body that can be obtained from a metal strip by roll forming, from which, at a first axial end face, an edge flange for the axial positioning of the deflection damping device in the opening protrudes radially outwards, and wherein a second axial end face is beaded for fixing the deflection damping device.

BRIEF DESCRIPTION OF THE DRAWINGS

The invention is explained further below with reference to exemplary embodiments, which are schematically shown in the attached drawings. In detail:

FIG. 3 shows an isometric view of a connecting device that can be pressed in;

DETAILED DESCRIPTION OF THE INVENTION

Figure 1:
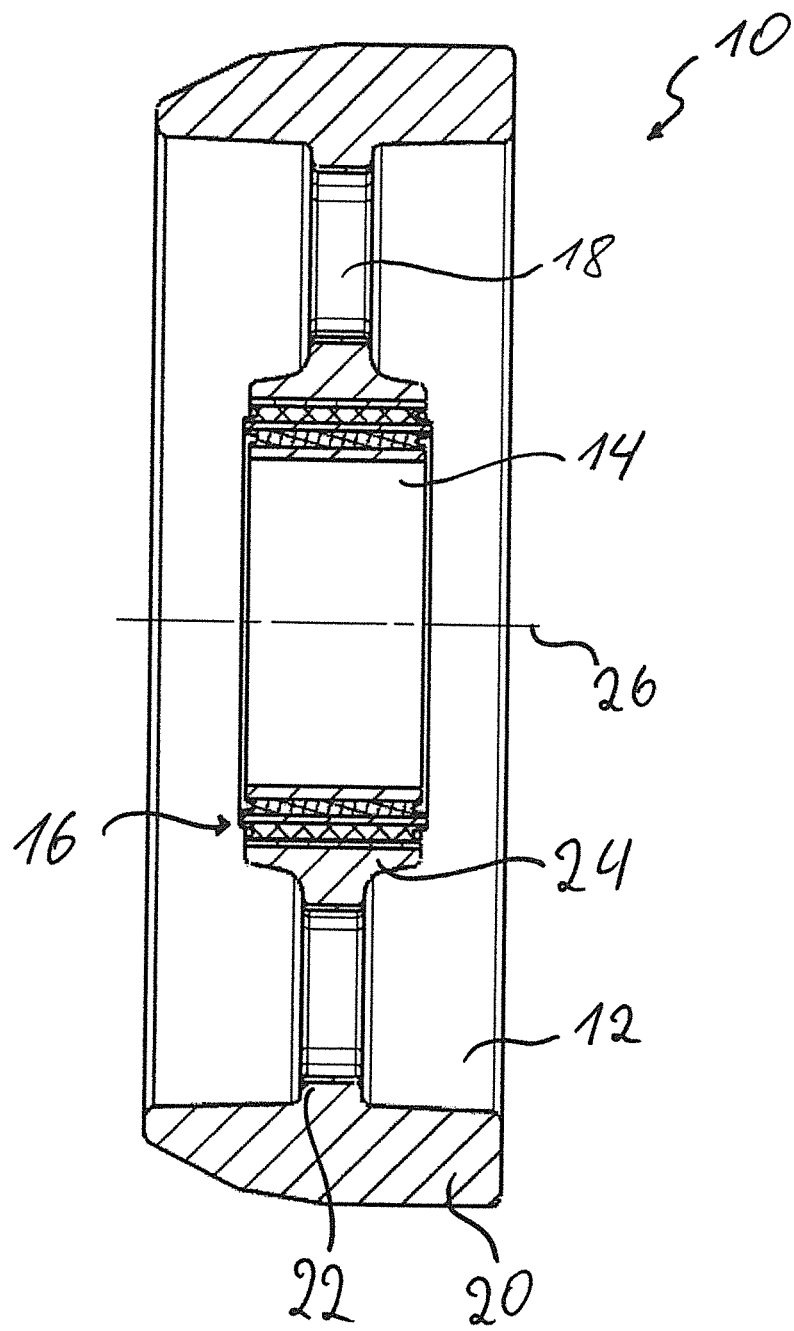
FIG. 1 shows an axial cross section through a vibration absorber according to a first embodiment of the invention.

The vibration absorber 10 shown in FIG. 1 has an inertia mass 12, a hub 14 and a connecting device 16. The inertia mass 12, the hub 14 and the connecting device 16 can each be based on rotationally symmetric bodies. The connecting device 16 elastically connects the inertia mass 12 with the hub 14.

For example, the vibration absorber 10 is provided for arrangement on a joint shaft coupling. For this purpose, the inertia mass 12 has, for example, openings 18 for accommodating mounting sleeves (not shown) of a joint shaft coupling.

The inertia mass 12 has a radially outer inertia ring 20, a connecting portion 22 in which the openings 18 are disposed, and a radially inner attaching portion 24.

The inertia mass 12, the hub 14 and the connecting device 16 are disposed, for example, concentrically around an axis of rotation 26. In order to obtain a small unbalance, the inertia mass 12, the hub 14 and the connecting device 16 can be configured in such a way that their center of gravity in each case lies on the axis of rotation 26.

Figure 2:
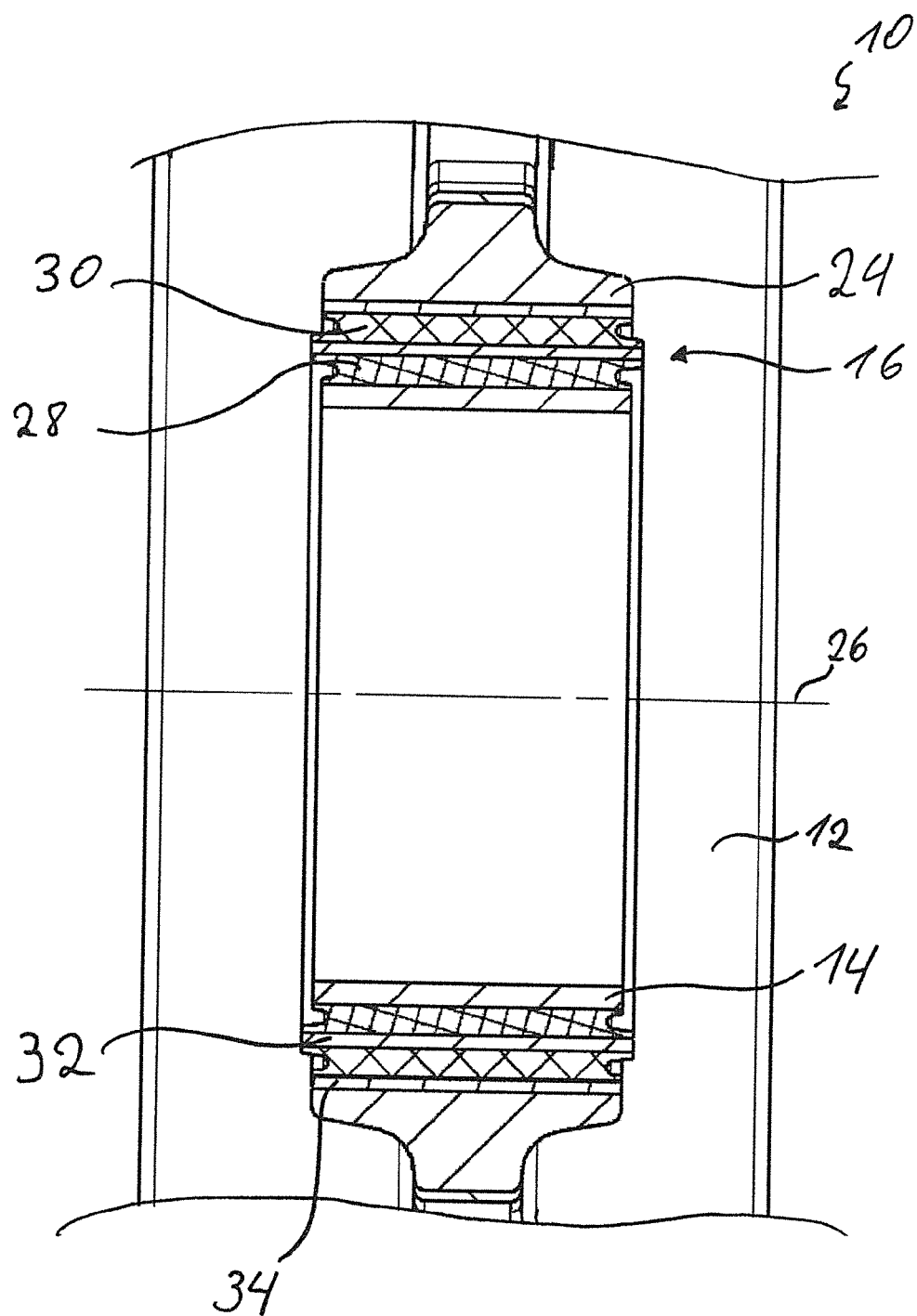
FIG. 2 shows an enlarged detail of the section from FIG. 1.

As shown in FIG. 2, the connecting device 16 has a first elastomer body 28 and a second elastomer body 30 in which a reinforcing member 32 is embedded. In addition, the connecting device 16 has an outer sleeve 34 that rests against the attaching portion 24 of the inertia mass 12. The first elastomer body 28 and the second elastomer body 30 together form a functional unit in which the reinforcing member 32 is embedded, and may be configured integrally.

The first elastomer body 28 is vulcanized onto the hub 14 and the reinforcing member 32. The second elastomer body 30 is vulcanized onto the reinforcing member 32 and the outer sleeve 34. The connecting device 16 is pressed into the connecting portion 22 of the inertia mass 12, so that the outer sleeve 34 establishes a non-positive connection with the attaching portion 24.

The vibration absorber 10 serves for absorbing torsional vibrations, for example, i.e. of irregular movement during the rotary movement about the axis of rotation 26. In the process, the elastomer bodies 28, 30 serve for elastically coupling the hub 14 with the inertia mass 12. The moment of inertia of the inertia mass 12 is transmitted by means of this elastic coupling onto the hub 14 and a shaft of a drive train, which may be connected thereto, for example, in order to counteract the propagation or amplification of the irregular movements.

As regards their properties, particularly the rigidity in the direction of rotation or torsion, the elastomer bodies 28, 30 and the reinforcing member 32 cooperate in such a way that they correspond to an elastomer body whose thickness in the radial direction corresponds to the sum of thicknesses of the elastomer bodies 28, 30. Their arrangement corresponds to the elastomer bodies 28, 30 being connected in series. Thus, the properties of the connecting device 16 in the direction of torsion are almost unchanged compared to a conventional elastomer body without a reinforcing member 32.

Elastomers, e.g. rubber or silicone, are incompressible. If a conventional elastomer body without a reinforcing member 32 is provided between the hub 14 and the inertia mass 12 and compressed during a radial displacement of the hub 14 relative to the inertia mass 12, the elastomer yields in the axial direction, whereby the axial free surfaces of the conventional elastomer body bulge outward. On the radially opposite side, the radial displacement results in the axial free surfaces of the elastomer body bulging inward. The deformation of the axial free surfaces of the elastomer body is the greater the larger the ratio of the free surface area to the bound, e.g. connected by vulcanization, surface area is.

The configuration according to the invention of the connecting device 16 with a reinforcing member 32 causes the ratio of the free surface area to the bound surface area of the elastomer body 28, 30 to become particularly small, because the thickness of the elastomer bodies 28, 30 in the radial direction is comparatively small. Thus, the deformation of the axial free surfaces is reduced and, at the same time, the rigidity of the connecting device 16 in the radial direction is increased, because the volume of the elastomer bodies 28, 30 that is able to yield in the axial direction is reduced. The reinforcing member 32 is formed, for example, as a cylindrical metal sleeve.

Thus, it is accomplished by means of the reinforcing member 32 that a higher radial rigidity of the connecting device 16 is obtained with the same amount of elastomer without reducing the torsional rigidity or the life of the vibration absorber 10. Due to the high level of radial rigidity, the deflection of the inertia mass 12 in the case of radial stress is limited, and thus an additional unbalance of the vibration absorber 10 is avoided.

Figure 3:
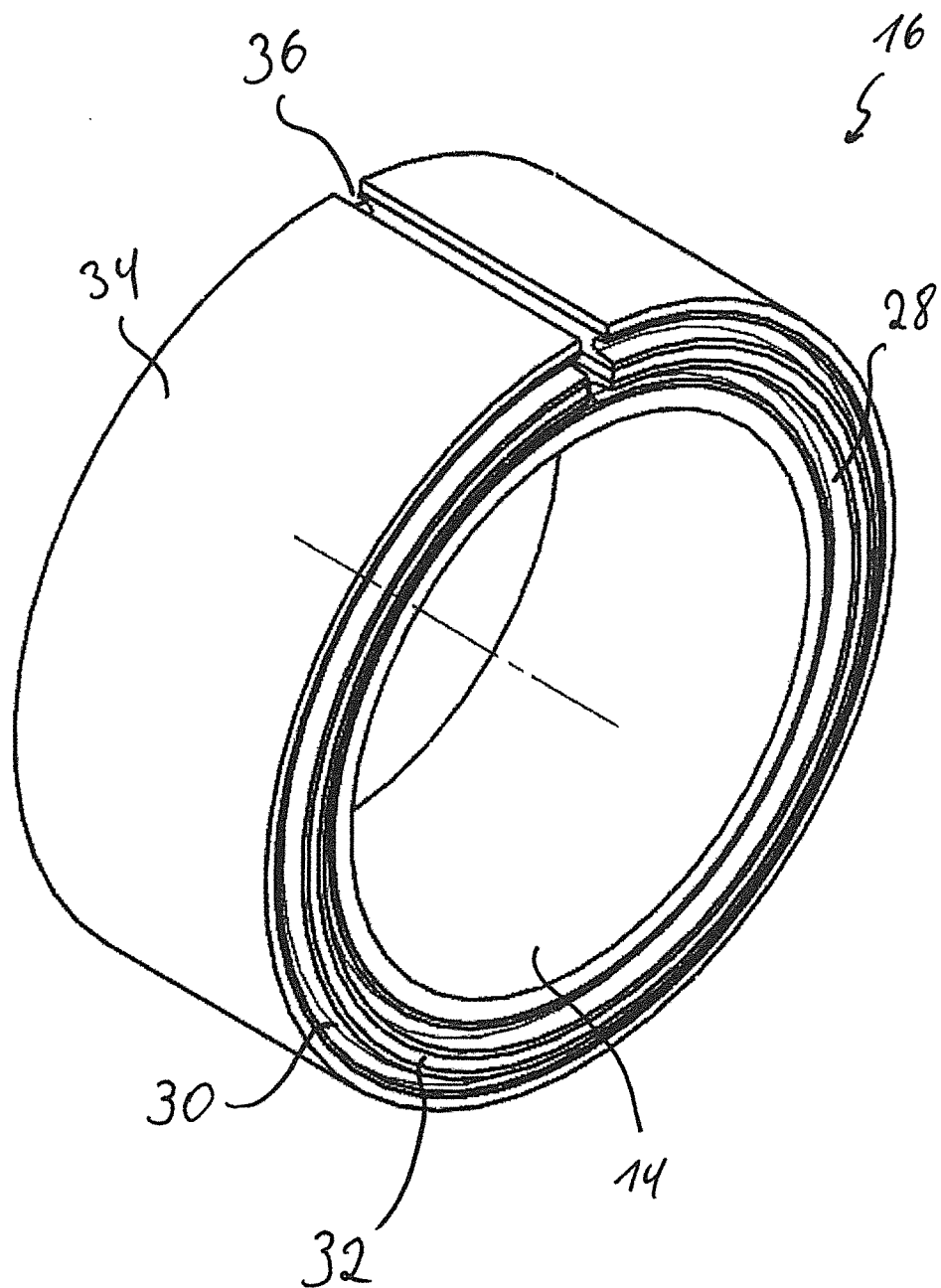
Figure 4:
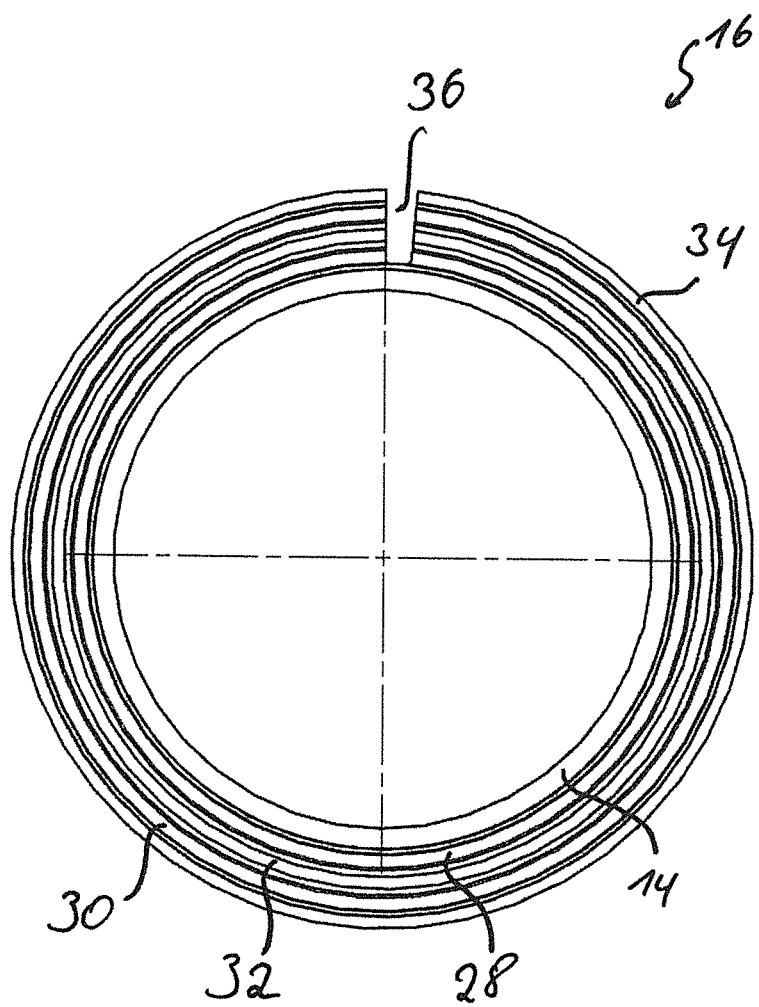
FIG. 4 shows an axial side view of the connecting device from FIG. 3.

FIG. 3 and FIG. 4 show the connecting device 16 together with the hub 14 as a semifinished product prior to being pressed into the inertia mass 12. The connecting device 16, which is configured to be largely rotationally symmetric, has a cut-out 36 in the circumferential direction that extends over the entire axial width of the connecting device 16. An outer circumference of the connecting device 16 is greater than an opening in the attaching portion 24 of the inertia mass 12 that is provided for accommodating the connecting device 16.

Consequently, when the connecting device 16 is pressed into the inertia mass 12, the connecting device 16 is compressed in the circumferential direction, so that the cut-out 36 is closed. The forces arising in the process produce the non-positive connection between the outer sleeve 34 and the inertia mass 12. Furthermore, the material of the elastomer bodies 28, 30 is biased or calibrated.

Because of the cut-out 36, it is not necessary to deform the material of the outer sleeve 34, the reinforcing member 32 or the hub 14 for the purpose of calibration. It is thus possible to achieve a particularly high level of calibration. As a consequence, the obtainable radial rigidity of the connecting device 16 in the pressed-in state continues to increase.

The outer sleeve 34, the reinforcing member 32 and the hub 14 are usually made of metal. Due to the fact that no deformation of the outer sleeve 34, the reinforcing member 32 or the hub 14 is required, the use of other materials, e.g. the use of plastic, is conceivable.

Figure 5:
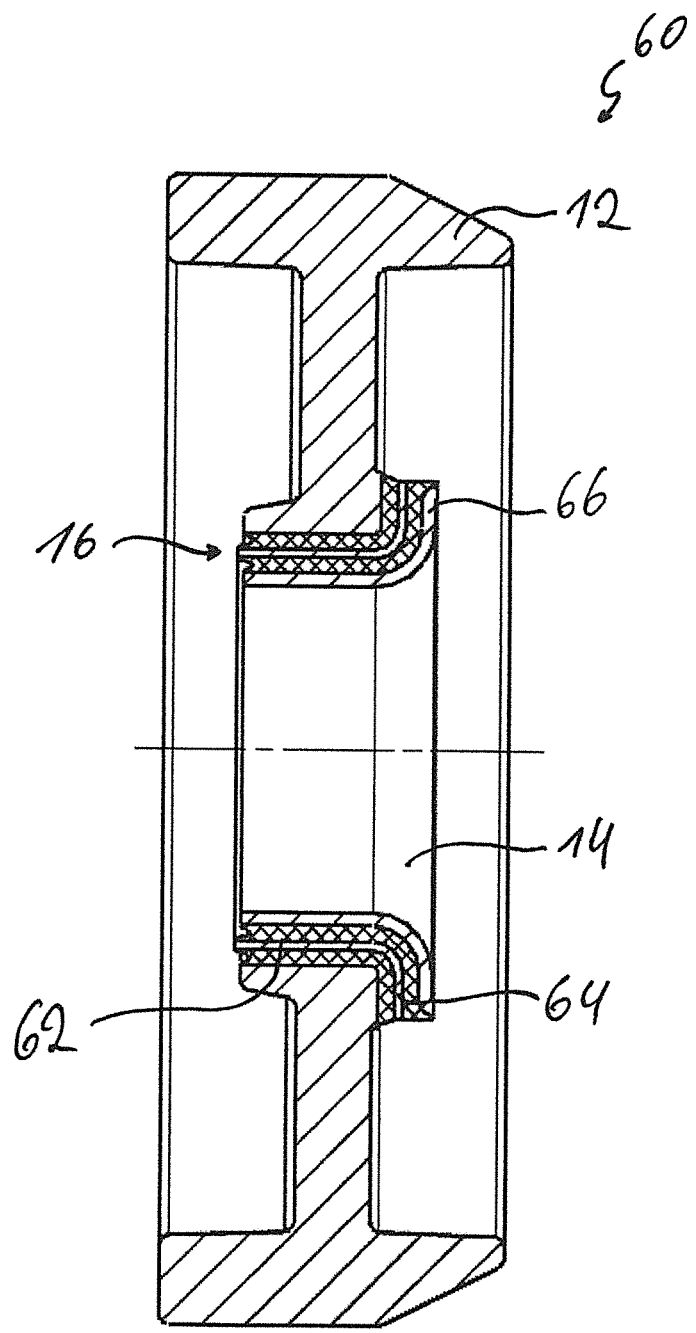
FIG. 5 shows an axial cross section through a vibration absorber according to a second embodiment of the invention.
Figure 6:
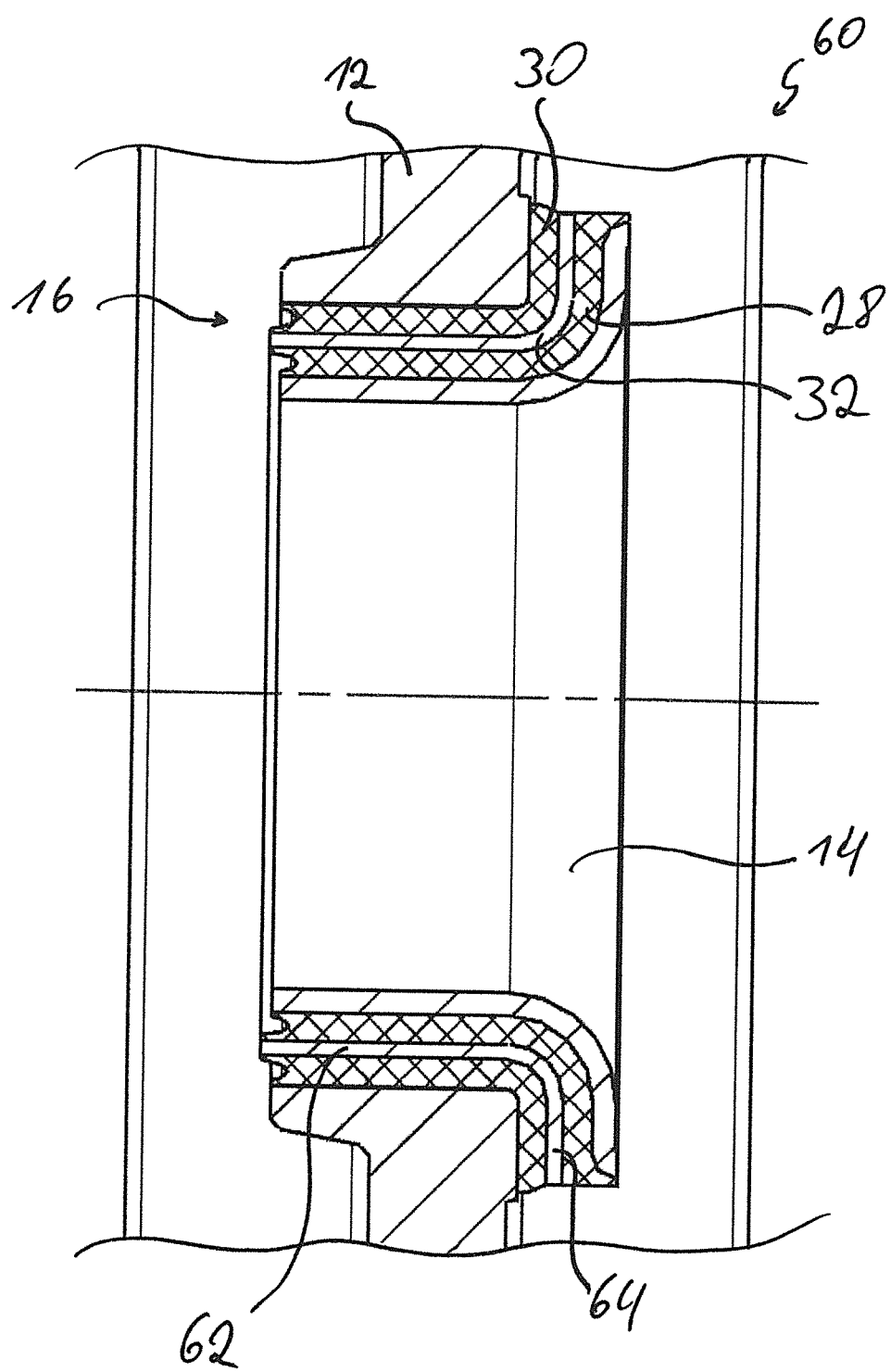
FIG. 6 shows an enlarged detail of the section from FIG. 5.

FIGS. 5 and 6 show a second embodiment of the invention in the form of a vibration absorber 60. In order to reduce a cardanic motion of the inertia mass 12, the connecting device 16 has a main portion 62 and a collar portion 64. The main portion 62 is substantially cylindrical. In the manner of a flange, the collar portion 64 protrudes outwards in the radial direction from the main portion 62. The first elastomer body 28, the second elastomer body 30 and the reinforcing member 32 thus have an L-shaped cross-section.

The hub 14 is also configured L-shaped with a collar portion 36 in order to enclose in the axial direction, between itself and the inertia mass 12, the connecting device 16 in the region of the collar portion 64. In the case of a cardanic deflection, e.g. in the case of a wobbling movement of the inertia mass 12, a stabilization of the inertia mass 12 in the axial direction is thus brought about, because a pressure load in the axial direction is generated on one side, and a tensile load is generated on the radially opposite side of the hub 14 and the connecting device 16. Elastomers are considerably more rigid in the direction of these tensile/pressure loads than in the shearing direction. Thus, the vibration absorber 60 is considerably more rigidly supported in the axial direction than a vibration absorber whose connecting device 16 and hub 14 have no collar portion 64, 66.

In the present embodiment, the collar portions 64, 66 protrude perpendicularly to the axis of rotation 26. It is also possible to have the collar portion 64, 66 protrude in an angle other than 90° relative to the axis of rotation 26.

The connecting devices 16 can be configured in various ways.

Figure 7:
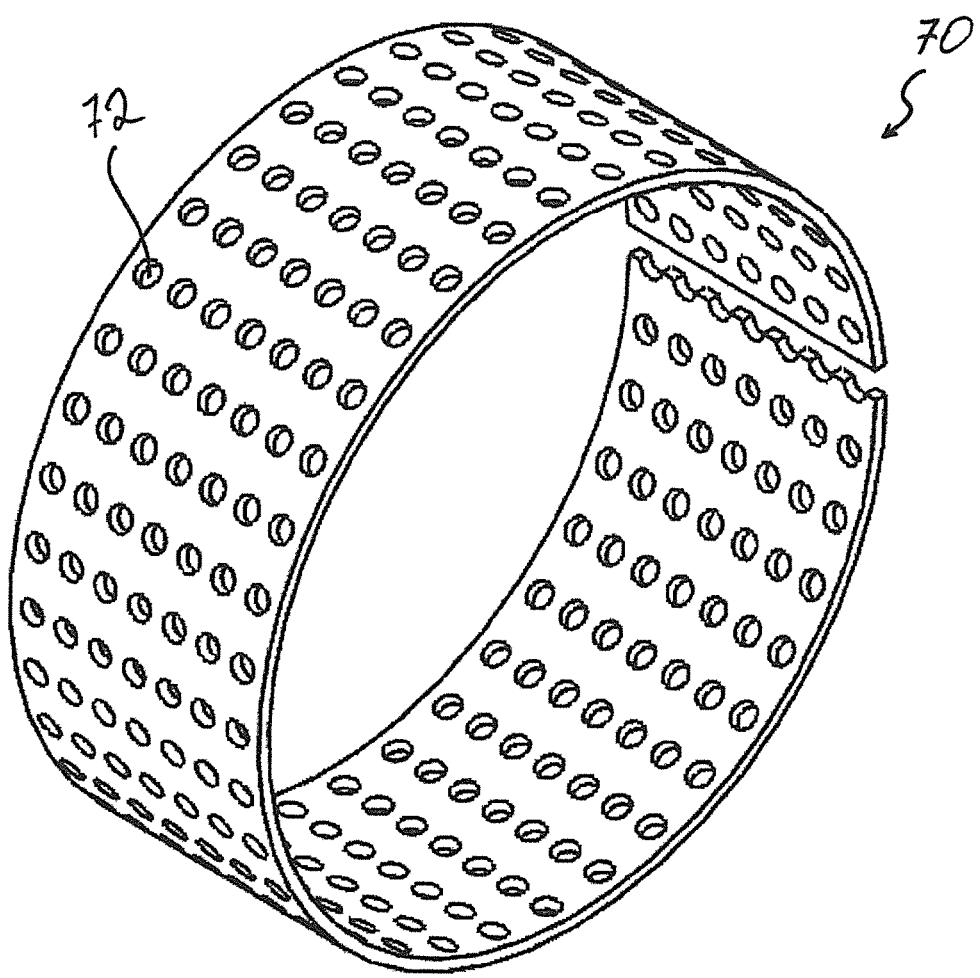
FIG. 7 shows an isometric view of a reinforcing member.

FIG. 7 shows an exemplary configuration of a reinforcing member 70. The reinforcing member is configured to be cylindrical and is formed from a perforated metal sheet. Therefore, the reinforcing member 70 has a plurality of cut-outs 72. During the production of the connecting device 16, the reinforcing member 70 is inserted into a vulcanization tool together with the outer sleeve 34 and the hub 14 and overmolded with elastomer. The elastomer flows into the cut-outs 72 and thus forms a positive connection with the reinforcing member 70 after vulcanization.

The cut-outs 72 may be cylindrical, but may also have any other suitable form. The diameter of the cut-outs 72 is, for example, between $\frac{1}{4}$ and $\frac{1}{20}$ of the axial width of the reinforcing member 70. The recesses 72 can, for example, be arranged in rows or offset rows. Because the elastomer of the elastomer bodies 28, 30 fills the cut-outs 72 during pouring or injecting, a positive connection is produced that can make a substance-to-substance connection, e.g. a connection by vulcanization, superfluous.

Figure 8:
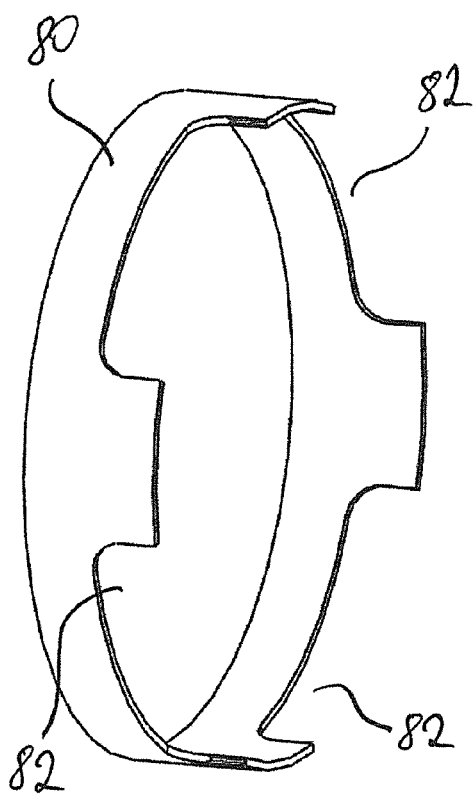
FIG. 8 shows an isometric view of another reinforcing member.

FIG. 8 shows another reinforcing member 80. The reinforcing member 80 has the shape of an annular peripherally extending metal strip, with recesses 82 being provided on an axial side of the metal strip. The recesses 82 can be arranged in such a way that a center of gravity of the reinforcing member 80 continues to lie on the axis of rotation 26. In particular, the recesses 82 may be uniformly distributed in the circumferential direction.

Figure 9:
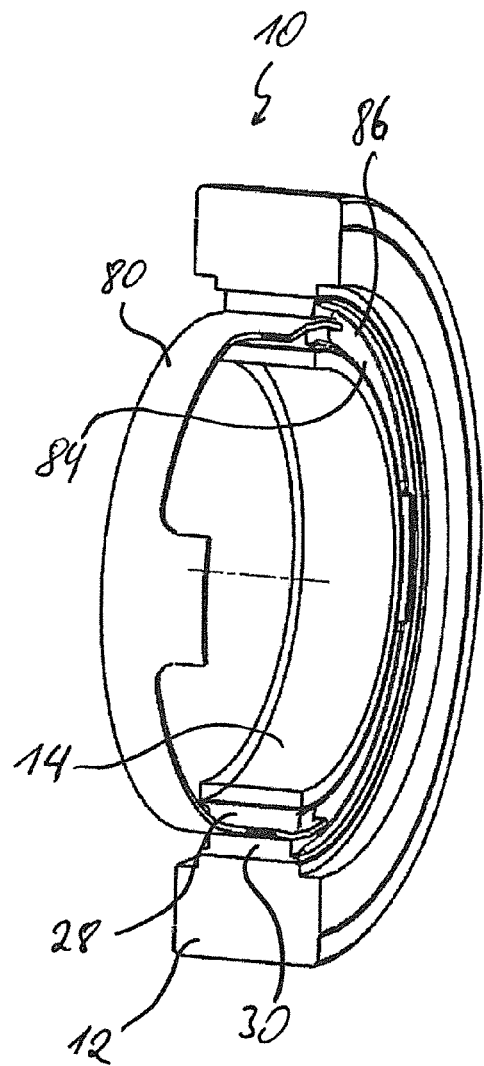
FIG. 9 shows an isometric partial cross-sectional view of a vibration absorber with the reinforcing member from FIG. 8.
Figure 10:
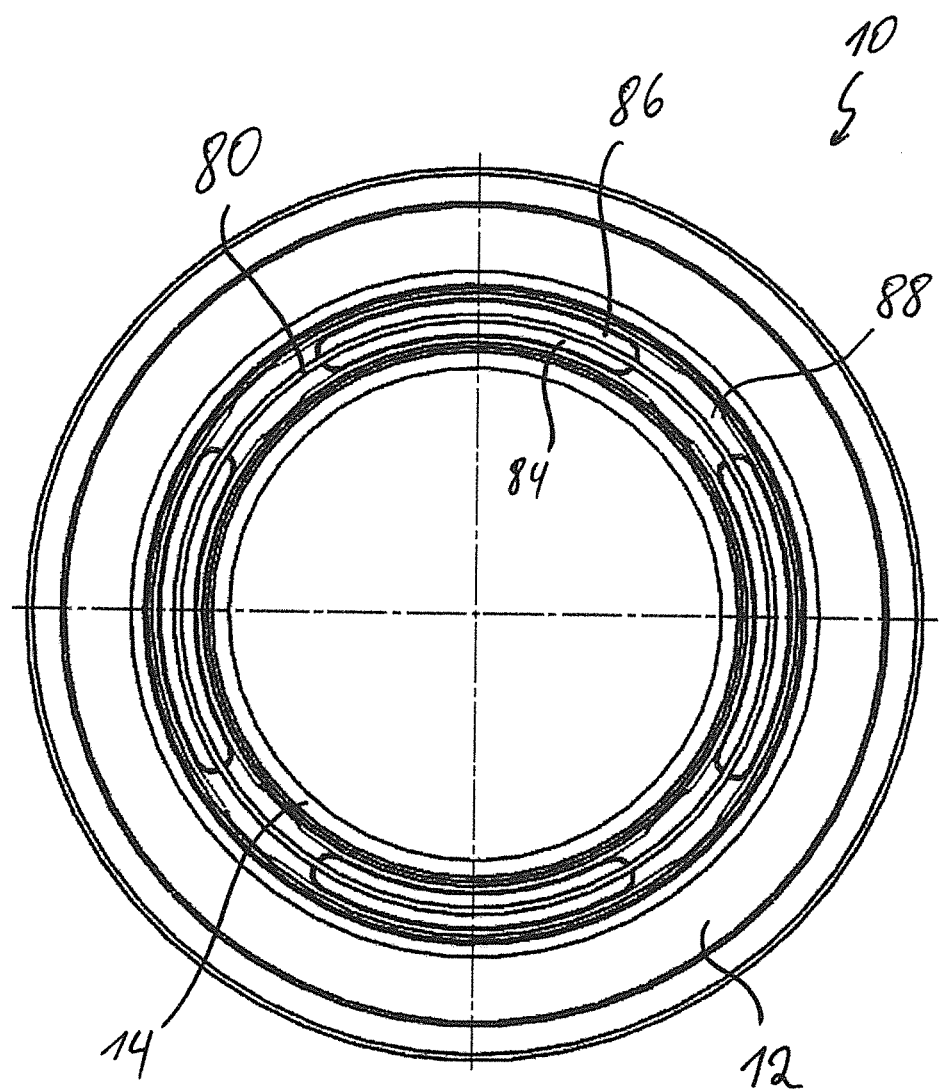
FIG. 10 shows an axial side view of the vibration absorber from FIG. 9.

This configuration of the reinforcing member 80 is particularly advantageous if the elastomer bodies 28, 30 of the connecting device 16 are not formed as annular elastomer bodies that extend over the entire periphery. FIGS. 9 and 10 show this by way of example. The first elastomer body 28 and the second elastomer body 30 have cut-outs 84, 86 that respectively extend in the circumferential direction. As a functional unit, the material of the elastomer bodies 28, 30 thus configured forms elastic supporting spokes 88.

The recesses 82 make it possible to design a vulcanization tool for the production of the supporting spokes 88 to be more robust, because the space of the recesses 82 is additionally available for the vulcanization tool.

Figure 11:
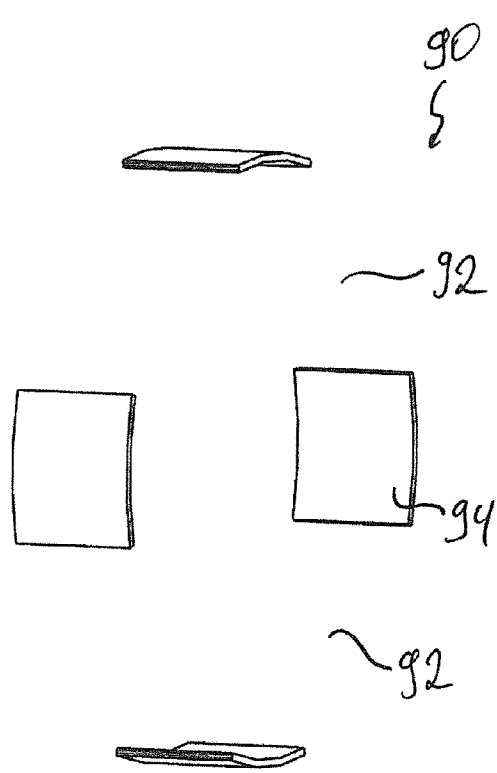
FIG. 11 shows an isometric view of another reinforcing member.
Figure 12:
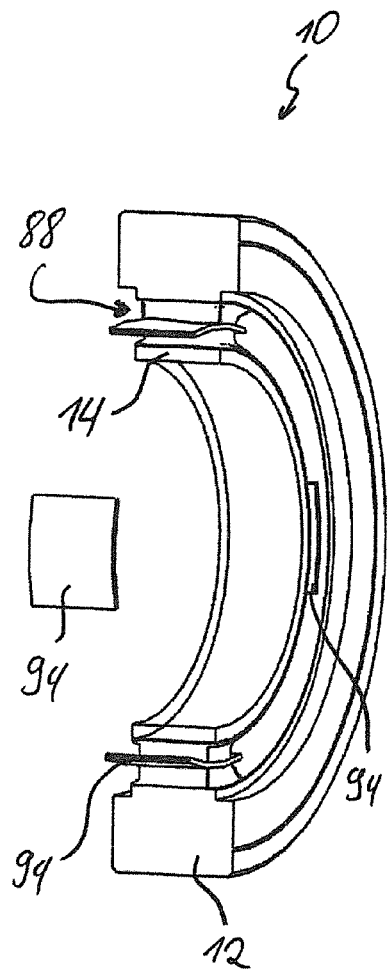
FIG. 12 shows an isometric partial cross-sectional view of a vibration absorber with the reinforcing member from FIG. 11.
Figure 13:
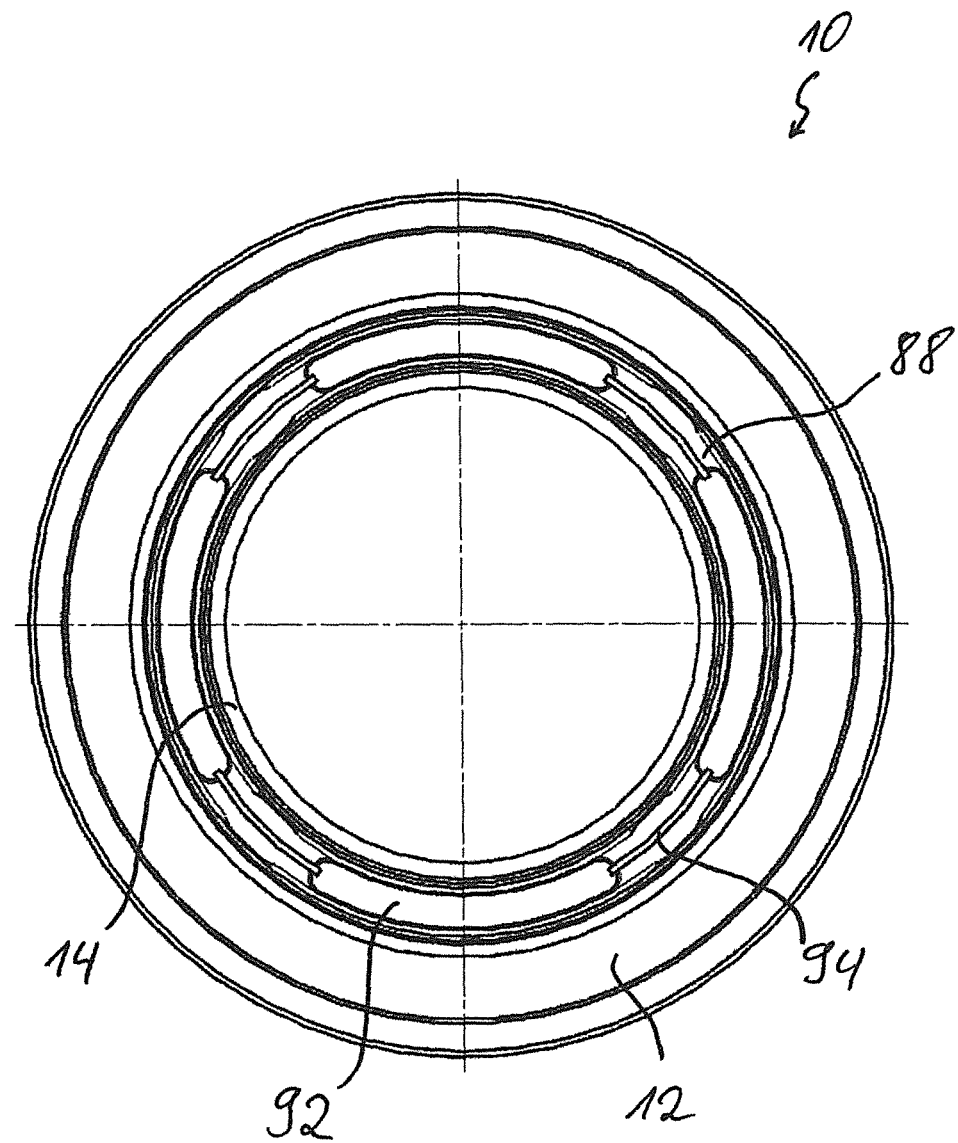
FIG. 13 shows an axial side view of the vibration absorber from FIG. 11.
Figure 14:
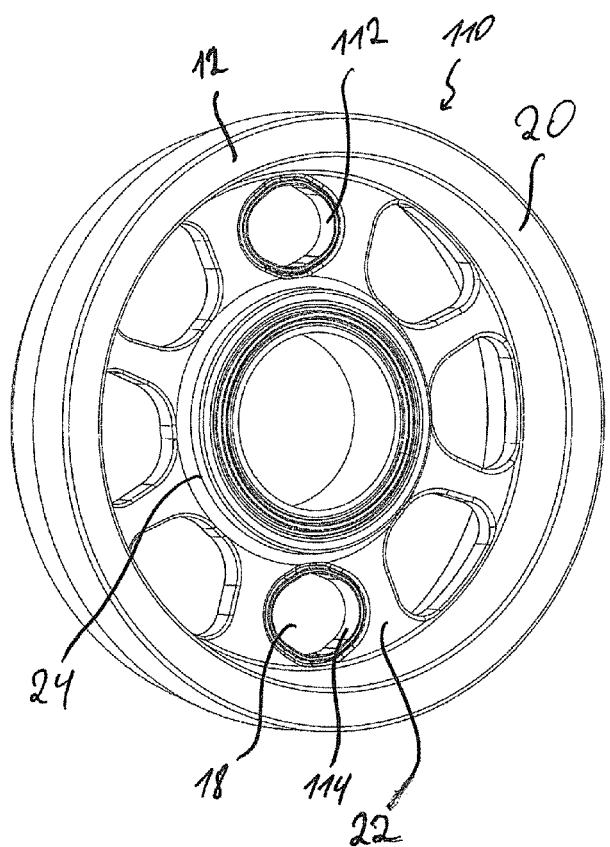
FIG. 14 shows a three-dimensional view of a vibration absorber according to a third embodiment of the invention.
Figure 15:
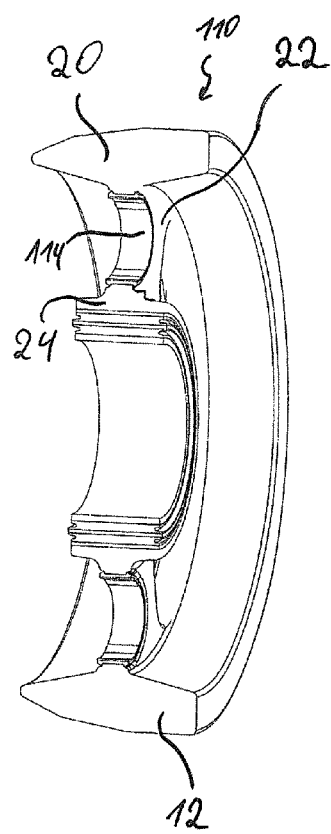
FIG. 15 shows a three-dimensional sectional view of the vibration absorber from FIG. 14.
Figure 16:
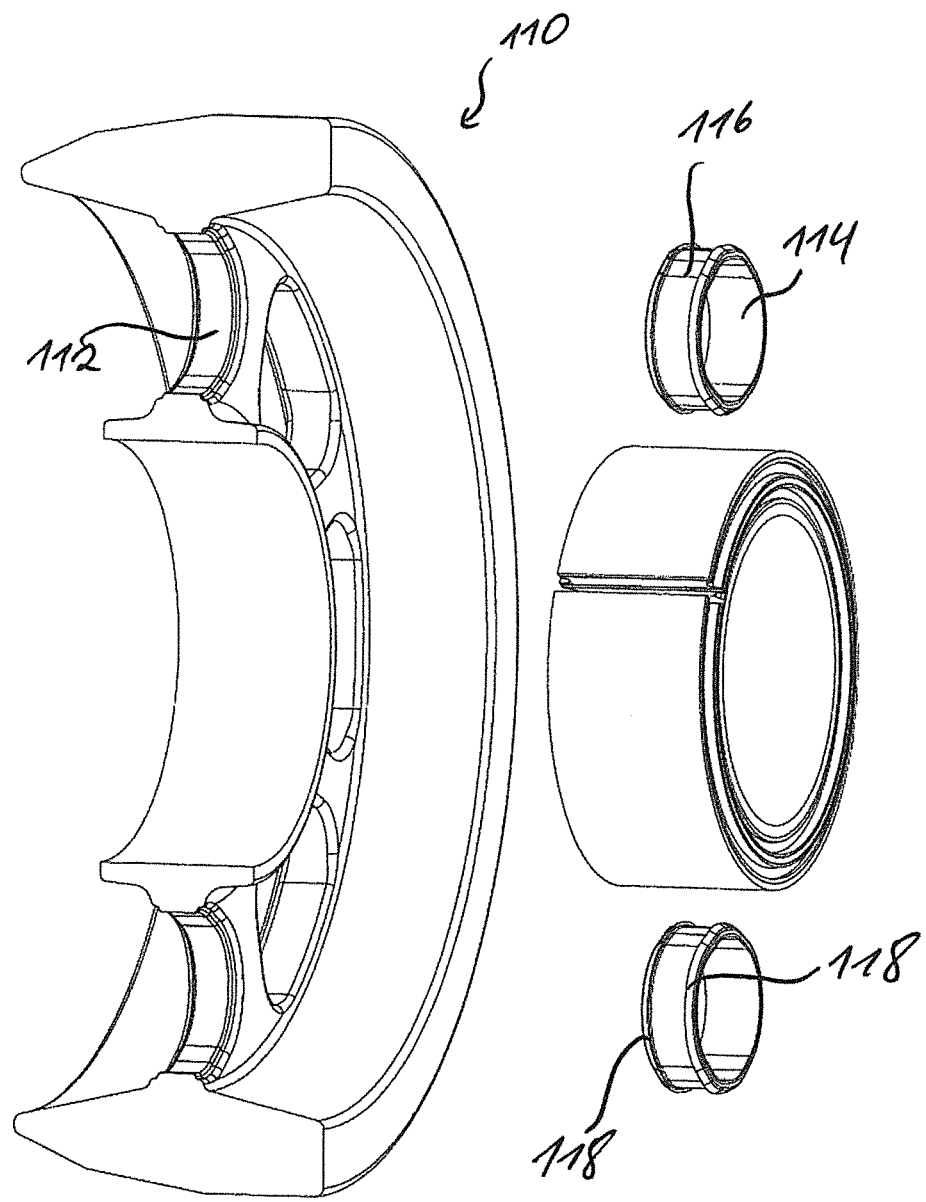
FIG. 16 shows a three-dimensional partial cross-sectional and exploded view of individual parts of the vibration absorber from FIG. 14.
Figure 17:
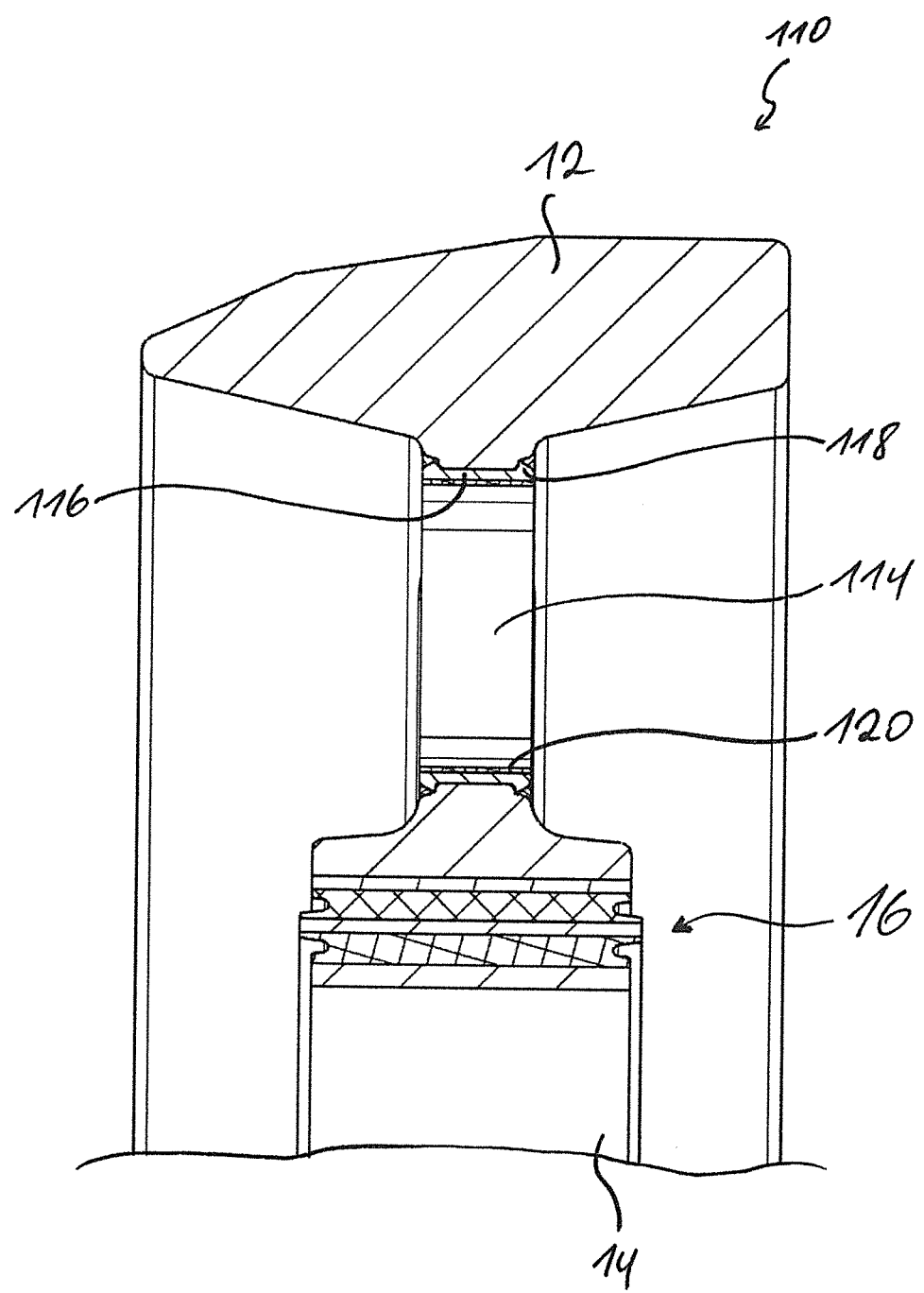
FIG. 17 shows a partial view of an axial cross section through a vibration absorber according to a fourth embodiment of the invention with a torsion stop.

One possible further development of this idea leads to the embodiment in the form of a reinforcing member 90 shown in FIGS. 11 to 13. The reinforcing member 90 has recesses 92 extending over the entire axial width of the reinforcing member 90. The reinforcing member 90 is thus formed by a plurality of spacer plates 94 that are respectively embedded in the supporting spokes 88.

A vibration absorber 110 provided for arrangement on a joint shaft coupling, for example, is shown in FIGS. 14 to 17. Openings 18 are provided in the attaching portion 24 of the inertia mass 12. The mounting sleeves, which are disposed in the openings 18 and which may, for example, be part of the joint shaft coupling (not shown), usually do not touch an inner face 112 of the openings 18. In the case of a large torsional stress, however, the attaching portion 24 can be torsionally deflected to such an extent that the mounting sleeves come into contact with the inner faces 112.

Figures 18, 19:
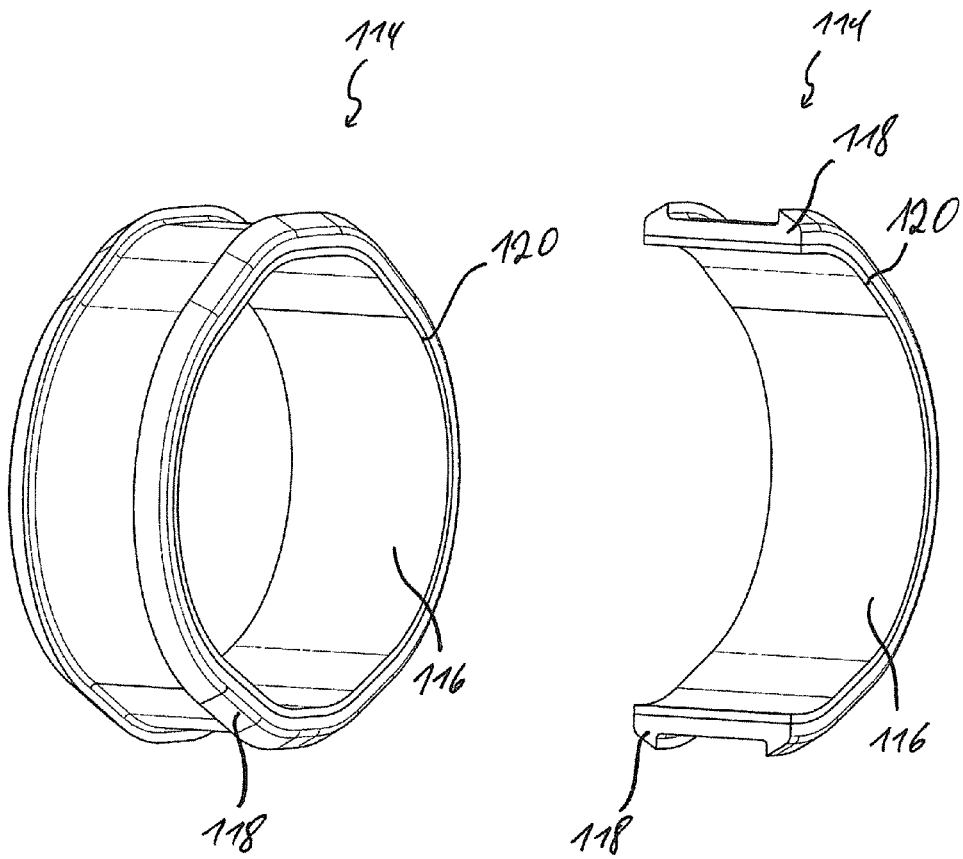
FIG. 18 shows a three-dimensional view of the torsion stop from FIG. 17.
FIG. 19 shows a three-dimensional sectional view of the torsion stop from FIG. 17.

In the case of such a contact, the attaching portion 24 or the mounting sleeve concerned can be damaged. Furthermore, bothersome metallic noises are generated by the impact. In order to avoid this, impact damping devices in the form of torsion stops 114 are disposed on the inner faces 112, which are shown by way of example in FIGS. 18 and 19. The torsion stops 114 have an annular body 116 from which peripherally extending projections 118 project radially outwards, in each case axially at the end faces. Because of the projections 118, the torsion stops 114 can be attached in the openings 18 by means of a snap-in connection, in which the projections 118 reach over edges of the openings 18. During the assembly of the vibration absorber 110, the torsion stops 114 are snapped in by means of the projections 118.

A coating 120, for example made of a low-cost thermoplastic elastomer, may be applied to an inner face of the torsion stops 114. The torsion stops 114 may substantially be made of plastic.

Figure 20:
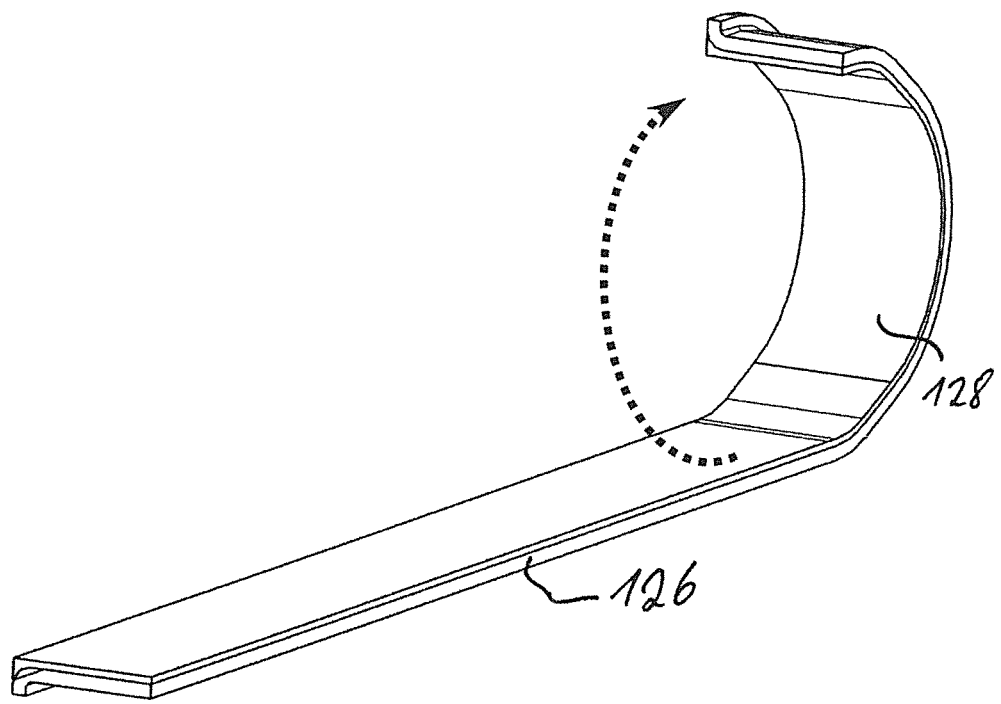
FIG. 20 shows a three-dimensional illustration of a process step for manufacturing a torsion stop.
Figure 21:
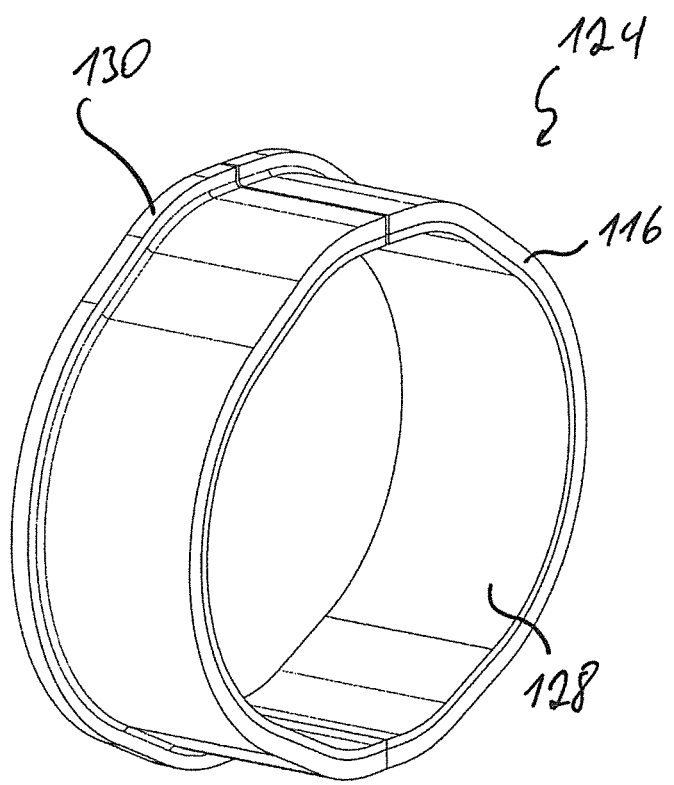
FIG. 21 shows a three-dimensional view of a torsion stop obtained with the method illustrated in FIG. 20.
Figure 22:
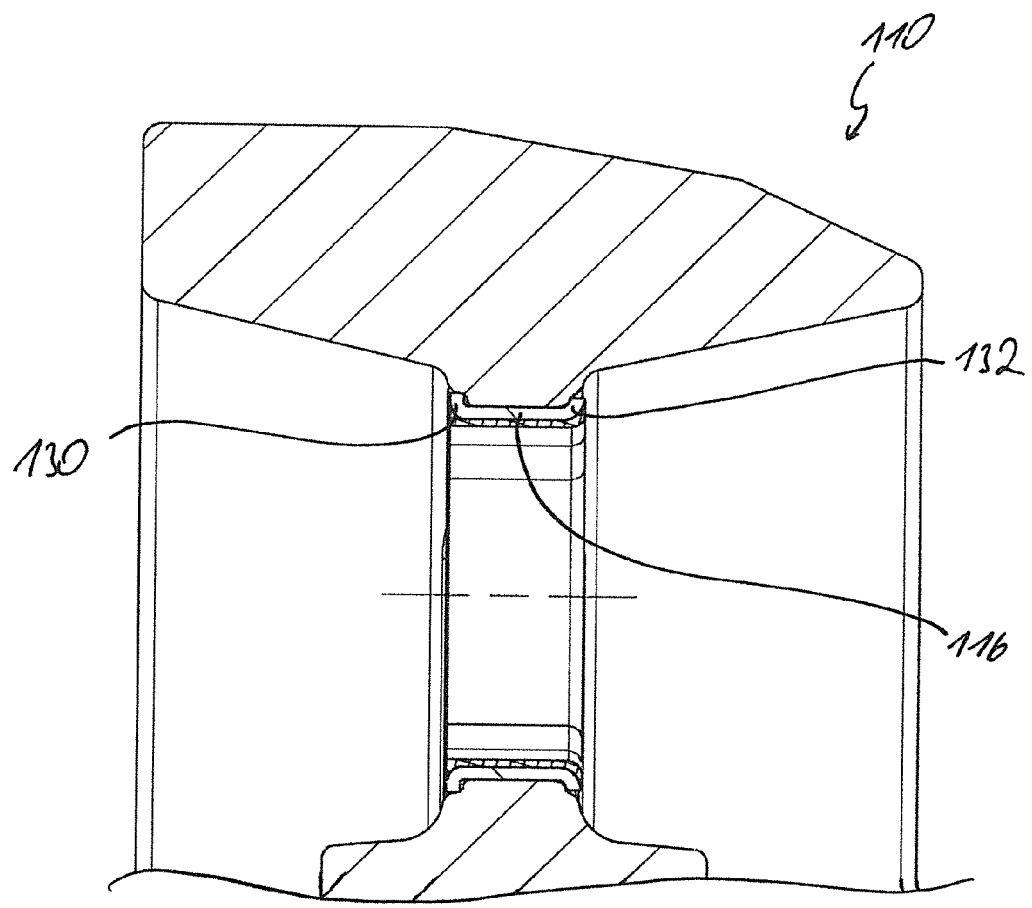
FIG. 22 shows a view as in FIG. 17 with a torsion stop from FIG. 21.

Another embodiment of a torsion stop 124 is shown in FIGS. 20 to 22. The torsion stop 124 is, for example, roll-formed from a metal strip 126 which is coated on an inner face 128 with a coating, e.g. of a soft plastic or a non-woven.

On a first axial side of the torsion stop 124, a protruding fixing edge 130 is disposed with which the torsion stop 124 can be brought to rest against an edge of the opening 18 during insertion into the vibration absorber 110. A fixing edge 132 on a second axial side of the torsion stop 124 may be beaded as a precaution, in order to ensure the secureness of the connection.

Compared with a manufacturing process in which an elastomer body 28, 30 is vulcanized onto the inertia mass 12, a modular method in which the connecting device 16 as described above (FIG. 3, 4, 16) is prefabricated together with the hub 14 as a module, separately from the inertia mass 12, has several advantages. For example, a lesser amount of mechanical processing of the inertia mass 12, which is usually configured as a cast part, is required. In particular, this is a result of the inertia mass 12 no longer having to be accommodated in the vulcanization tool, which requires a very precise shaping of the inertia mass 12.

Furthermore, a method step in which the inertia ring is pretreated with a binding agent for vulcanization can be omitted. The vulcanization tool is also simplified because the hub 14, the reinforcing member 32 and the outer sleeve 34 only have to be placed in the vulcanization mold. No space must be provided in the vulcanization tool for the heavy and large inertia mass 12. The parts to be vulcanized are smaller, increasing the simplicity of the vulcanization tool, which results in lower costs per unit during production.

In this modular construction, separately produced torsion stops 114, 124 can be used flexibly in various designs as a standard component.

The reinforcing members 32, 70, 80, 90 can be combined with all embodiments of the connecting device 16 and with all embodiments of the vibration absorber 10, 60, 110. The torsion stops 114, 124 can be combined with all embodiments of the vibration absorber 10, 60, 110. Where an embodiment of the vibration absorber 10, 60, 110 has no openings 18, they can be added at a suitable location.

The connecting device 16 may have more than one reinforcing member 32, 70, 80, 90, so that the connecting device 16 may have more than two elastomer bodies 28, 30. Different reinforcing members 32, 70, 80, 90 can be spaced from each other in the radial and/or in the circumferential direction. If several reinforcing members 32, 70, 80, 90 are used, they need not have an identical design. In such an embodiment, the elastomer bodies 28, 30 may have the same or different layer thicknesses.

The vibration absorber 10, 60, 110 according to the invention can be disposed on almost all rotating parts of the drive train. In particular, a connection with a cross joint flange, a constant-velocity joint flange, a gearbox flange or a multi-armed flange is possible. Locations where bothersome vibrations frequently arise, e.g. due to local resonance rises, are preferred for arrangement.

To the person skilled in the art, it is a matter of course that the embodiments specified herein show the invention only by way of example. The reference numerals used merely serve for the clear illustration of the embodiments and not for limiting the invention. The person skilled in the art may vary various features of the embodiments shown herein or design other embodiments without departing from the scope of the invention, which is solely defined by the attached claims.

| Reference Sign List | |
|---|---|
| 10 | Vibration Absorber |
| 12 | Inertia mass |
| 14 | Hub |

-continued

| Reference Sign List | |
|---|---|
| 16 | Connecting device |
| 18 | Opening |
| 20 | Inertia ring |
| 22 | Connecting portion |
| 24 | Attaching portion |
| 26 | Axis of rotation |
| 28 | First elastomer body |
| 30 | Second elastomer body |
| 32 | Reinforcing member |
| 34 | Outer sleeve |
| 36 | Recess |
| 60 | Vibration Absorber |
| 62 | Main portion |
| 64 | Collar portion |
| 66 | Collar portion |
| 70 | Reinforcing member |
| 72 | Cut-out |
| 80 | Reinforcing member |
| 82 | Recess |
| 84 | Cut-out |
| 86 | Cut-out |
| 88 | Supporting spoke |
| 90 | Reinforcing member |
| 92 | Recess |
| 94 | Spacer plate |
| 110 | Vibration Absorber |
| 112 | Inner face |
| 114 | Torsion stop |
| 116 | Body |
| 118 | Projection |
| 120 | Coating |
| 124 | Torsion stop |
| 126 | Metal strip |
| 128 | Coating |
| 130 | Fixing edge |
| 132 | Fixing edge |

The invention claimed is:

1. A torsional vibration absorber for a drive train, the vibration absorber comprising:
   a hub;
   an inertia mass; including an inertia ring;
   a first vulcanized elastomer body;
   second vulcanized elastomer body;
   at least one reinforcing member which is at least partially embedded in the first and second elastomer bodies,
   wherein the first elastomer body is connected by vulcanization between the hub and reinforcing member and the second elastomer body is connected by vulcanization between the reinforcing member and inertia mass to elastically connect the hub and the inertia mass with one another and
   wherein the reinforcing member has a spacer sleeve having a cylindrical shape having a constant inner and outer diameter and wherein the reinforcing member is connected to the first and second vulcanized elastomer bodies, so as to absorb torsional vibrations from the drivetrain.

2. The vibration absorber according to claim 1, wherein the reinforcing member has a plurality of cut-outs for accommodating elastomer.

3. The vibration absorber according to claim 1, wherein the reinforcing member has recesses disposed one behind the other in a circumferential direction and spaced apart.

4. The vibration damper according to claim 1, wherein the first elastomer body can be pressed into the inertia mass.

5. The vibration damper according to claim 4, wherein in the circumferential direction, the the first elastomer body, the second elastomer body, and the at least one reinforcing member each have at least one cut-out that is configured so that the cut out can be closed during pressing into the inertia mass.

6. The vibration damper according to claim 1, wherein the connecting device has a main portion, which substantially extends in the axial direction, and a collar portion, which protrudes in the radial direction from the main portion, wherein the hub has a collar portion extending in the radial direction and resting against the collar portion of the connecting device.

7. The vibration damper according to claim 1, wherein the inertia mass has a disc-shaped connecting portion in which an opening for accommodating a deflection damping device is disposed.

8. The vibration damper according to claim 7, wherein the deflection damping device has an annular body, from which projections for snap-in attachment in the openings project radially outwards, in each case axially at the end faces, in such a way that, in the snapped-in state, the projections radially reach over edges, which are located axially at the ends, of the openings.

9. The vibration damper according to claim 7, wherein the deflection damping device has an annular body that can be obtained from a metal strip by roll forming, from which, at a first axial end face, an edge flange for the axial positioning of the deflection damping device in the opening protrudes radially outwards, and wherein a second axial end face is beaded for fixing the deflection damping device.

* * * * *